United States Patent Office 3,384,459
Patented May 21, 1968

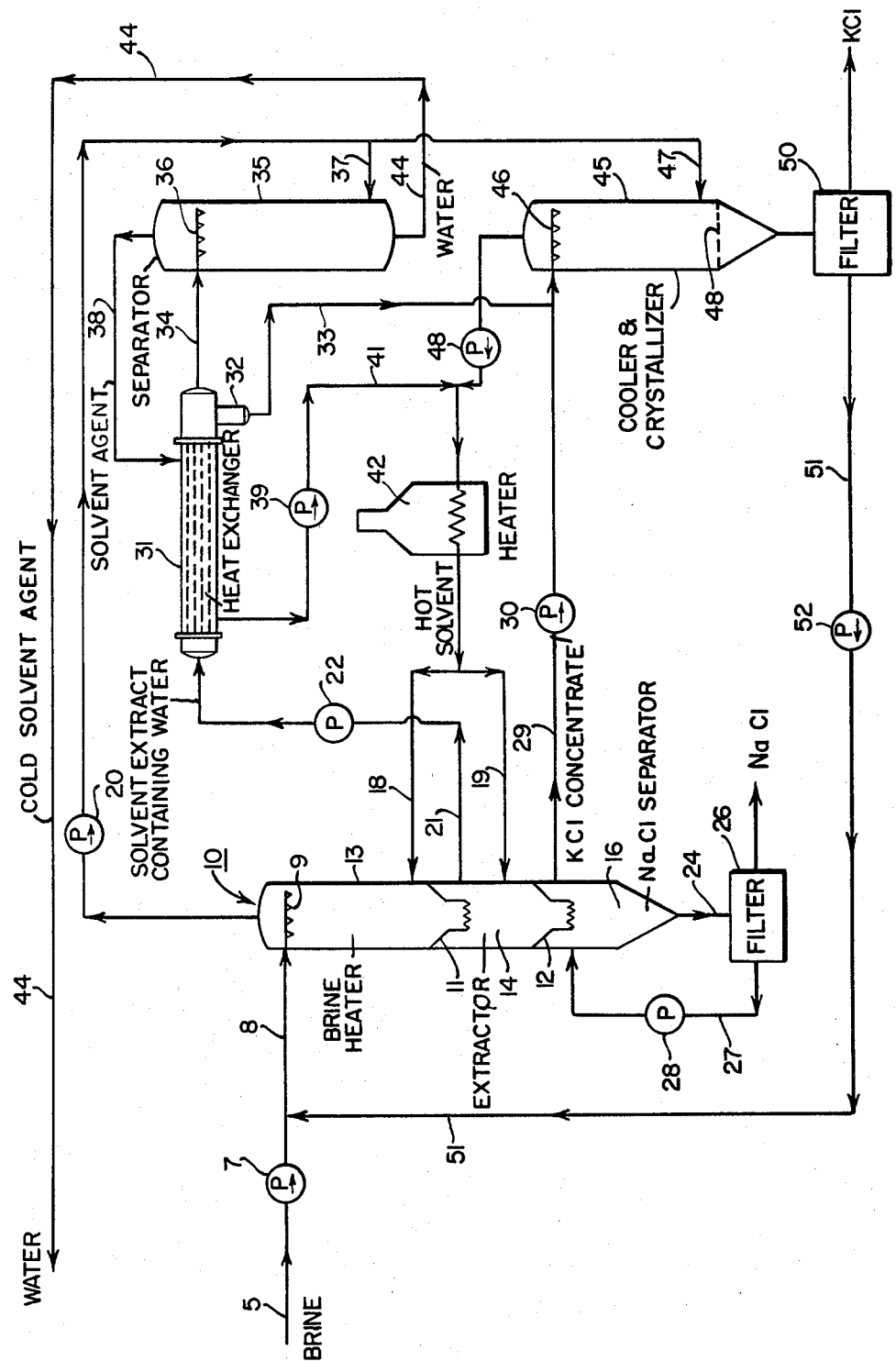

3,384,459
SEPARATION OF SODIUM CHLORIDE
FROM POTASSIUM BY SELECTIVE
CRYSTALLIZATION
Norman D. Carter, Poughkeepsie, Frank E. Guptill, Jr., Fishkill, and Howard V. Hess, Glenham, N.Y., assignors to Texaco Inc., New York, N.Y., a corporation of Delaware
Filed Nov. 19, 1964, Ser. No. 412,466
6 Claims. (Cl. 23—296)

ABSTRACT OF THE DISCLOSURE

A process for the recovery of potassium chloride in crystalline form from brines containing a mixture of chlorides of sodium and potassium by selective crystallization in which feed brine is concentrated to precipitate sodium chloride by extraction of water at a temperature above about 500° F. and under sufficient pressure to retain resulting brine concentrate in liquid phase. Feed brine is contacted at said elevated temperature and pressure with an organic liquid capable of extracting more water at elevated temperature than at a lower temperature, e.g. a liquid hydrocarbon, followed by withdrawal of an immiscible extract phase from resulting brine concentrate containing sodium chloride crystals, sodium chloride crystals are removed from resulting concentrated brine, and potassium chloride recovered from the concentrated brine by crystallization.

---

The present invention relates to a process and apparatus for the recovery of salts from brines. The process is particularly applicable to recovery of salts from brines obtained by solution mining of water-soluble mineral salts, such as potash deposits. The process is also applicable to the recovery of salt-free water from brine.

In one of its more specific aspects, the present invention is concerned with a process for extracting water from a salt solution or brine by means of an organic liquid characterized by the property of extracting a greater amount of water at an elevated temperature than at a lower temperature and of releasing water from the extract as the temperature is decreased below the extraction temperature.

In carrying out the process of this invention, the organic liquid is brought into contact with the brine at an elevated temperature and pressure, for example, 500 to 650° F. and 1000 to 2000 p.s.i.g., to extract water from the brine. The removal of water from the brine supersaturates the brine with respect to its dissolved salts so that the salts crystallize from the concentrated brine. The salt crystals may be recovered from the residual brine as product. By selective crystallization under controlled conditions of temperature and salt concentrations, mixed salts may be separated from one another as illustrated in more detail hereinafter.

At the elevated temperature, the organic liquid forms a complex with the water extracted from the brine. The complex may be in liquid phase or a dense vapor phase at the temperature and pressure of the system. Hydrocarbons, for example, are effective for extraction at temperatures above their critical temperatures at the operating conditions. The complex is immiscible with the residual brine and has a lower specific gravity than the brine and is separated from the residual brine by gravity. After the complex is separated from the residual brine, the complex is resolved by decreasing the temperature sufficiently below the extraction temperature to cause the organic liquid and water to separate from one another as two immiscible liquid phases. The organic liquid may be reused in the process while the salt-free water may be recovered as a product of the process or recirculated for solution of salts. The process is particularly applicable to solution mining operations.

The term "brine" is used in a broad sense to denote the entire range of concentrations of water soluble inorganic salts in water, for example, natural saline water containing sodium chloride and potassium chloride, including brackish water, sea water, and saturated or nearly saturated brines, such as brines obtained from wells.

Recently there has been a great deal of interest in solution mining of soluble mineral deposits, particularly in the solution mining of potassium chloride deposits. Usually potassium chloride occurs in underground mineral deposits in admixture with sodium chloride. Of particular interest now for solution mining are the deposits of potassium chloride and sodium chloride in Canada and in the southwestern parts of the United States. The Canadian deposits are often too deep for economical mining by conventional mining methods. On the other hand, some of the potash deposits in the Carlsbad, New Mexico area are of insufficient thickness to be economically mined by conventional mining procedures. In either case, solution mining appears to offer the promise of economical recovery of the potassium chloride from these underground deposits.

One of the problems involved in solution mining of potash deposits is the recovery of the potassium chloride from the solution after it is brought to the surface of the earth. The water may be removed and the salts crystallized from the brine by evaporation of the water, for example, by a series of large multiple effect vacuum evaporators. These installations require a large capital investment, particularly for apparatus handling highly corrosive concentrations of potassium chloride. Expensive corrosion resistant metals or alloys are required to protect equipment from corrosion by the brine in the large evaporators and related equipment.

The process of this invention eliminates many of the problems encountered in the conventional plant employing evaporators, and, in particular, minimizes the problems of corrosion. Corrosion problems are limited to a relatively small area of the equipment which is subject to contact with corrosive brine. The portions of the equipment subject to corrosive attack from the mineral salts may be protected by protective liners or coatings. The apparatus required for carrying out the process of this invention is capable of removing substantially greater amounts of water for a given size vessel than is possible with evaporators. The process of the invention and some of its other advantages will be apparent from the following detailed description of the process as applied to the recovery of potassium chloride from saturated sylvinite brine. According to Faith, Keyes and Clark, Industrial Chemistry, second edition, John Wiley, New York, sylvinite deposits occur in the permian strata of west Texas and in the Carlsbad area of New Mexico.

Hydrocarbon liquids are preferred as the organic liquids employed for the extraction of water from brines by the process of this invention. Other organic liquids which may be used in the process include high molecular weight hydrocarbon derivatives, for example, alcohols, ketones and ethers containing from 8 to 12 carbon atoms per molecule which have the property of extracting more water at high temperatures than at lower temperatures.

The term "complex" is used herein to designate the solution of water in the organic liquid or supercritical vapor separated from the residual brine in the extraction zone in the process of this invention.

For greatest efficiency, the extraction step of the process should be operated at a temperature above 500° F. and at a pressure within the range of 1000 to 2000 p.s.i.g. sufficient to maintain the brine in liquid phase at the operating temperature. The effect of temperature on the extraction efficiency of the organic liquid is illustrated, for example, by normal decane which has the property of extracting 22.2 percent of its weight of water at 575° F., 9 percent at 550° F., and 3.3 percent at 500° F. Consequently, with the extraction step of the process operating at 575° F. and the separation step operating at 500° F., there is a recovery of water from the brine amounting to about 19 weight percent of the n-decane per pass. In general, pressure higher than 2000 p.s.i.g. are not desirable since the amount of water extracted in the organic liquid at a given temperature decreases with increasing pressure. For example, cumene at 625° F. has the property of extracting about 47 weight percent water at 2000 p.s.i.g., 28.5 weight percent at 2500 p.s.i.g., and about 8 weight percent at 3000 p.s.i.g.

The operating temperature is preferably kept above 550° F. and preferably above 600° F. The upper temperature limit should be below that at which the decomposition of the organic liquid might occur at the pressure and under other conditions in the system, e.g., the presence of water vapor and salts. The temperature and pressure are coordinated so that the operating pressure is in excess of the vapor pressure of the brine in the extraction step and above the vapor pressure of the water in the water recovery step at the temperature conditions of these steps. In the present process, the pressure at which the complex is resolved and the water separated from the organic liquid is essentially the same as the pressure employed in the extraction step. It is to be understood, however, that in some cases the extraction may be carried out effectively at a pressure somewhat lower than the pressure in the phase separation step.

Normally liquid hydrocarbons are generally suitable for use in the process of this invention. Hydrocarbons and mixtures of hydrocarbons containing from 6 to 30 carbon atoms per molecule are useful in the process. Hydrocarbon liquids of 6 to 12 carbon atoms per molecule are preferred. Various petroleum fractions which may be used in the process include kerosene; naphtha; odorless spirits; gasoline; lubricating oils; "alkylation bottoms," i.e., the bottoms fraction obtained from the alkylation of butylenes with isobutane; $C_9$–$C_{10}$ aromatic hydrocarbons, e.g., aromatic hydrocarbons obtained by alkylation of benzene or toluene with propylene; and Udex extract, i.e. an aromatic hydrocarbon fraction obtained from petroleum naphtha by extraction with diethylene glycol containing water. Examples of individual hydrocarbon types which can be used in the process, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methylcyclohexane, dimethylcyclohexanes, ethylcyclohexane, tetralin, isopropylcyclohexane, cyclohexene, pinene, etc.; and aromatic hydrocarbons, e.g., benzene, toluene, cumene, xylenes, methylnaphthalenes, etc.

The preferred organic liquids are those which are stable under the temperature and pressure conditions employed in the process, for example, 550° F. to 650° F. and 1000 to 3000 p.s.i.g. If the water is to be used for domestic purposes, the organic liquid employed should have low toxicity and low solubility in water at ordinary temperatures and atmospheric pressure. In general, the aromatic hydrocarbons are preferred for concentration of brines for salt recovery, and the saturated hydrocarbons are preferred for the production of potable water.

The figure illustrates diagrammatically an arrangement of apparatus for carrying out the process of this invention which in the following specific example is described as applied to the processing of sylvinite brine as obtained by a solution mining operation.

With reference to the figure, saturated brine obtained by solution mining of underground deposits of sylvinite is drawn through line 5 by pump 7 at 40° F., mixed with recycle brine, as described hereinafter, and introduced through line 8 and distributor 9 into the upper end of column 10. Column 10 is a vertical, cylindrical pressure vessel divided by trap trays 11 and 12 into a brine heater section 13, an extraction section 14, and a separator section 16. Each of the trap trays has a central downcomer, each preferably provided with serrations at its lower end, as illustrated, to insure even distribution of upflowing hydrocarbon liquid along the inner wall of vessel 10.

The concentrated brine of this example contains 31.5 pounds sodium chloride and 11.5 pounds potassium chloride in 100 pounds of water. Throughout this specification, all rates are expressed relative to 100 pounds of water in the brine fed to the system.

Recycle brine at 68° F., from a source hereinafter described, is mixed with saturated feed brine in line 8 at the rate of 20.7 pounds of water, 6.3 pounds sodium chloride and 3.2 pounds potassium chloride per 100 pounds of water in the brine entering the system through line 5. The composite stream enters the top of column 10 at 45° F.

The brine heater section 13 of column 10 is maintained full of liquid with hydrocarbon liquid as the continuous phase and with brine as the discontinuous phase. The hydrocarbon protects the walls of the vessel from corrosion by the brine. Saturated brine entering the upper part of the column through distributor 9 flows down through the column in direct counter-current heat exchange with upwardly flowing hot hydrocarbon liquid whereby the brine is heated and the hydrocarbon cooled. In this example, the hydrocarbon liquid is Udex extract. Hot Udex extract is introduced in the lower part of the brine preheater 13 at 670° F. through line 18 at the rate of 239.7 pounds hydrocarbon liquid, together with 4.8 pounds of water. The hydrocarbon liquid is cooled to 64° F. by direct counter-current contact with the cool brine, heating the brine to 650° F. The cool hydrocarbon liquid is discharged from the top of column 10 to pump 20.

Preheated brine from the brine heater 13 flows down through trap tray 11 into extractor 14 where it is contacted with hot Udex extract supplied through line 19 at 670° F. in an amount equivalent to 323.7 pounds hydrocarbon and 6.6 pounds water per 100 pounds of water contained in the brine supplied to column 10 from line 5. In the extractor, water is removed from the preheated brine, forming a complex of water and hydrocarbon. The complex, or extract of water in hydrocarbon, is withdrawn from the extractor at 650° F. through line 21 by pump 22 at a rate equivalent to 323.7 pounds hydrocarbon and 116.5 pounds of water per 100 pounds of water in the feed brine. The extraction step is controlled so that sufficient water is removed from the brine to reach saturation or near saturation with respect to potassium chloride.

Residual brine containing solid sodium chloride crystals liberated from the brine as a result of the extraction of the water in extractor 14 flows down through trap tray 12 into the separator or decanter section 16 at the lower end of column 10. The residual brine comprises 15.6 pounds of water, 6.3 pounds of sodium chloride and 14.7 pounds of potassium chloride per 100 pounds water in the feed brine and contains 31.5 pounds solid crystalline sodium chloride. Only the separator section 16 of vessel 10 is in direct contact with concentrated brine. Section 16 of column 10 may be provided with a protective lining and trap tray 12 is preferably constructed of corrosion resistant material.

The sodium chloride crystals, with sufficient brine to carry them as a slurry, are discharged from the lower part of separator 16 through line 24 to a filter 26 where the solid sodium chloride is separated from residual brine as product of the process. Residual brine filtrate is returned to separator 16 through line 27 by pump 28. Clear residual brine, free from sodium chloride crystals, is drawn from the upper part of separator 16 through line 29 by pump 30 for further processing to recover potassium chloride, as described in more detail hereinafter.

The water-hydrocarbon complex is discharged from extractor 14 through line 21 is introduced into a heat exchanger 31, e.g. a shell and tube type exchanger, where it is cooled from 650° F. to 400° F. by indirect heat exchange with Udex extract. Cooling of the complex in heat exchanger 31 causes the water and Udex extract to separate from one another as two immiscible liquid phases. A small amount of the water phase is withdrawn from a water leg 32 at the cooler end of the heat exchanger and passed through line 33 into the brine from line 29 to dilute the brine just sufficient to prevent deposition of sodium chloride from the brine in cooler and crystallizer 45. The amount of water drawn off at the water leg 32 and added to the brine in this example is equivalent to 6 pounds per 100 pounds of water in the incoming brine feed.

The cooled complex, including remainder of the water liberated from the complex in heat exchanger 31, is passed through line 34 to column 35 where it is distributed into upflowing hydrocarbon liquid by distributor 36. Cool Udex extract at 64° F. from the top of column 10 is introduced through line 37 to lower end of column 35 at a rate equivalent to 189.3 pounds hydrocarbon per 100 pounds of water in the initial feed brine entering through line 5. Water liberated from the complex flows down through column 35 in direct countercurrent contact with the Udex extract. The Udex extract is heated by the water to 393° F. and is withdrawn from column 35 through line 38 to heat exchanger 31 at a rate equivalent to 513 pounds hydrocarbon, together with 10.5 pounds of water, per 100 pounds of water in the feed brine. In heat exchanger 31, the Udex extract is heated from 393° F. to 638° F. by indirect heat exchange with the hydrocarbon-water complex and is passed by pump 39 through line 41 to heater 42.

Water liberated from the complex in heat exchanger 31 and in column 35 is cooled to 84° F. in column 35 by direct countercurrent contact with the Udex extract. The water is discharged from the bottom of column 35 through line 44 through which it is returned to an input well, not illustrated, for the recovery of additional sylvinite from the underground deposits.

Brine drawn from separator 16 at 650° F. through line 29, saturated with respect to potassium chloride, is supplied by pump 30 to the upper end of cooler and crystallizer 45. This brine is diluted with the water from line 33 at 400° F., diluting the brine and cooling it to 601° F. The dilute brine enters the upper part of brine cooler and crystallizer 45 at the rate of 21.6 pounds of water, 6.3 pounds sodium chloride and 14.7 pounds potassium chloride per 100 pounds of water in the feed brine. The brine enters column 45 through distributor 46 which disperses it in upflowing hydrocarbon liquid.

In cooler and crystallizer 45, the brine is cooled by direct countercurrent heat exchange with Udex extract from column 10 introduced into the lower part of cooler and crystallizer 45 through line 47 at 64° and at a rate equivalent to 50.4 pounds of hydrocarbon per 100 pounds water in the brine feed to the system. In operation, cooler and crystallizer 45 is maintained full of liquid, with hydrocarbon liquid as the continuous phase and brine as the discontinuous phase in the upper part of the vessel and a separate brine phase, containing crystalline potassium chloride, in the lower part of the vessel. The separate brine phase, the upper level of which is indicated by dotted line 48, permits withdrawal of residual brine and crystalline potassium chloride free from hydrocarbon from the bottom of vessel 45. The Udex extract is heated to 595° F. by direct heat exchange with the brine and is discharged, together with 0.9 pound water, from the upper end of cooler and crystallizer 45 through line 47 to pump 48 and heater 42. In heater 42, Udex extract from columns 35 and 45 is heated to 670° F. and supplied to column 10 through lines 18 and 19 as previously described.

Cooling of the brine in cooler and crystallizer 45 causes crystallization of potassium chloride from the brine. The concentration of sodium chloride is below the concentration necessary to saturate the brine with sodium chloride so that the potassium chloride crystals are essentially free from sodium chloride. The crystalline potassium chloride is withdrawn from the bottom of cooler and crystallizer 45 together with residual brine comprising 6.3 pounds sodium chloride and 3.2 pounds potassium chloride in solution in 20.7 pounds of water. The mixture of residual brine and solid potassium chloride crystals is discharged at 68° F. to filter 50. In filter 50, the potassium chloride crystals are recovered as a product of the process in an amount equivalent to 11.5 pounds per 100 pounds of water in the brine fed to the system from line 5. The concentrated brine at 68° F., is passed through line 51 by pump 52 to line 8 where it is mixed with the feed brine from line 5 and supplied to column 10 for recycle to the process.

It will be evident that the brine feed to the process from the brine wells through line 5 is separated into sodium chloride crystals discharged from filter 26, potassium chloride crystals discharged from filter 50, and salt-free water recycled through line 44. In the event that the fresh water is not required for recycle to the wells, it may be used for domestic purposes. In the latter case, the water may be treated for removal of trace amounts of hydrocarbon, e.g., by passing the water through an activated charcoal filter, not illustrated.

We claim:

1. A process for the recovery of potassium chloride from brine containing chlorides of sodium and potassium which comprises contacting brine at an elevated temperature above about 500° F. and at a pressure sufficient to maintain brine in liquid phase with an organic liquid selected from the group consisting of hydrocarbons containing 6 to 30 carbon atoms per molecule and alcohols, ketones and ethers containing 8 to 12 carbon atoms per molecule having the ability to extract more water at a higher temperature than at a lower temperature in relative proportions such that water is extracted, removing the organic liquid and extracted water leaving a brine concentrate residue containing sodium chloride crystals formed at said elevated temperature substantially without the formation of potassium chloride crystals, separating sodium chloride crystals from resulting concentrated brine, cooling the brine concentrate to provide a KCl concentrated brine with the formation of potassium chloride crystals substantially without formation of sodium chloride crystals, recovering crystalline potassium chloride from resulting residual brine, cooling said organic liquid containing said extracted water removed from said brine by an amount sufficient to form a water phase and a separate organic liquid phase, and separating the water phase from the organic liquid phase.

2. A process according to claim 1 wherein said organic liquid is a hydrocarbon.

3. A process according to claim 1 wherein said residual brine comprising sodium chloride and potassium chlorides is returned to the process.

4. A process according to claim 1 wherein organic liquid phase separated from said extract is passed in heat exchange with said extract thereby heating the organic liquid and cooling the extract, and resulting heated organic liquid is contacted with brine for further extraction of water from brine.

5. A process according to claim 2 wherein a minor amount of water is added to said concentrated brine following the removal of said sodium chloride crystals sufficient to prevent crystallization of sodium chloride from said residual brine during said cooling step.

6. A process according to claim 2 in which residual brine resulting from separation of potassium chloride crystals is mixed with fresh brine and returned to the process.

References Cited

UNITED STATES PATENTS

| | | | |
|---|---|---|---|
| 2,211,397 | 8/1940 | Weidig | 23—312 |
| 2,382,360 | 8/1945 | Weiner | 23—312 |
| 3,008,655 | 11/1961 | Adams | 23—312 |
| 3,051,548 | 8/1962 | Wilson | 23—312 |

FOREIGN PATENTS

| | | |
|---|---|---|
| 482,579 | 3/1938 | Great Britain. |
| 819,526 | 6/1937 | France. |

NORMAN YUDKOFF, *Primary Examiner.*

G. P. HINES, *Assistant Examiner.*